United States Patent [19]

Hashimoto et al.

[11] Patent Number: 5,053,288

[45] Date of Patent: Oct. 1, 1991

[54] OPTICAL RECORDING MEDIUM

[75] Inventors: Eiichi Hashimoto, Tokyo; Tetsuo Sato, Hino; Kiyoshi Chiba, Chofu, all of Japan

[73] Assignee: Teijin Limited, Osaka, Japan

[21] Appl. No.: 273,440

[22] Filed: Nov. 18, 1988

[30] Foreign Application Priority Data

| Nov. 20, 1987 | [JP] | Japan | 62-292174 |
| Feb. 3, 1988 | [JP] | Japan | 63-22122 |
| Mar. 14, 1988 | [JP] | Japan | 63-58363 |

[51] Int. Cl.$^5$ ............................................. G11B 3/68
[52] U.S. Cl. ............................ 428/694; 428/900; 428/463; 369/13; 430/171; 430/173; 430/945
[58] Field of Search ............... 428/694, 900, 463; 360/131, 135; 369/13, 14; 365/122; 430/171, 173, 945

[56] References Cited

U.S. PATENT DOCUMENTS

| 4,362,799 | 12/1982 | Kondo et al. | 430/273 |
| 4,584,259 | 4/1986 | Mayer et al. | 430/945 |
| 4,650,743 | 3/1987 | Galloway | 430/273 |
| 4,729,938 | 3/1988 | Tajima et al. | 430/271 |
| 4,737,408 | 4/1988 | Kuwahara et al. | 428/694 |
| 4,760,012 | 7/1988 | Mochizuki et al. | 430/945 |
| 4,814,257 | 3/1989 | Galloway | 430/271 |
| 4,821,050 | 4/1989 | Yabe et al. | 428/694 |
| 4,861,637 | 8/1989 | Ueda et al. | 430/945 |

Primary Examiner—Merrell C. Cashion, Jr.
Assistant Examiner—Robert J. Follett
Attorney, Agent, or Firm—Sughrue, Mion, Zinn, Macpeak & Seas

[57] ABSTRACT

An optical recording medium, particularly a magneto-optical recording medium, resistant to oxidation deterioration even in a hot and humid atmosphere, is provided by forming an organic protecting adhesive layer of a UV-curved resin having (1) an acid value of not more than 1.5; and (2) a softening point of not less than 50° C. The UV-curved resin layer comprises 15 to 85% by weight of acrylate and/or methacrylate having at least three functionalities; 15 to 70% by weight of a compound having a linear structure and having a molecular weight of at least 300, the compound preferably having at least one ethylenically unsaturated bond and a molecular weight of at least 150 per ethylenically unsaturated bond; and (3) a photopolymerization initiator.

22 Claims, 2 Drawing Sheets

OPTICAL RECORDING MEDIUM

BACKGROUND OF THE INVENTION

1. Field of the Invention

The present invention relates to an optical recording medium and a process for manufacturing the same. More particularly, the present invention concerns an organic protecting layer by which the life time of an optical recording medium, particularly a magneto-optical recording medium, is prolonged.

2. Description of the Related Art

The development and production of optical recording discs as memory devices having the ability to store a large amount of information is widespread in the communication technology field, and of these devices, research into the development of a practical magneto-optical recording disc capable of rewriting is particularly active.

A typical magneto-optical recording disc comprises a transparent plastic substrate of polycarbonate, a magneto-optical recording film of TbFeCo, a dielectric layer of ZnS between the plastic substrate and the magneto-optical recording film, and a protecting layer of ZnS over the magneto-optical recording film. Note, the magneto-optical recording film is usually protected by a dielectric layer on both sides or one side thereof, and as a result, the magneto-optical recording film has a remarkably prolonged life time in comparison with a film not having this protection, i.e., direct exposure of the magneto-optical recording film to the atmosphere. This prolonged life time is about 5 to 6 years at present.

Nevertheless, a life time of at least 10 years is required for a practical recording disc, and thus the above protection is insufficient. For example, when a magneto-optical recording disc having the typical structure mentioned above was subjected to accelerated aging at 60° C. with 90% R H, pin holes appeared in the recording film after about 50 hours and the C/N (carrier to noise ratio) and BER (bit error rate) were degraded.

Further, if during storage of a magneto-optical recording disc the magneto-optical recording film thereof is in contact with the atmosphere, the magneto-optical recording film is selectively corroded by oxygen and humidity in the atmosphere, and thus the writing and reading of information become impossible.

Accordingly, the following measures are taken to improve the durability of the film: (i) the provision of a protecting layer on the surface of the magneto-optical recording film; (ii) the adhesion of another transparent plastic substrate to the surface of the magneto-optical recording film (single sided recording medium); and, (iii) the adhesion of two recording media so that the recording films face each other (double sided recording medium).

Attempts have been made to provide an inorganic layer of AlN, $SiO_2$ or the like, as the protecting layer mentioned above, by evaporation, but the obtainable inorganic moisture sealing layer is not uniform and has an insufficient moisture sealing ability, resulting in an inevitable deterioration of the magneto-optical recording film with an elapse of time.

Attempts also have been made to form a protecting layer of a cold-cured resin, but this layer too has an insufficient moisture sealing ability, and a permeation of moisture and oxygen completed before the curing is causes a deterioration of the recording film.

Therefore, the main objects of research into an improvement of the durability of a magneto-optical recording disc are the adhesion of another plastic substrate as a protecting layer or the adhesion of two magneto-optical recording discs, as mentioned above. In the manufacture of a magneto-optical recording disc having a lamination by adhesion structure, however, the following problems arise: (i) a deterioration of the recording film by oxidation by an active ingredient such as an acidic material in the adhesive (resin); and (ii) the strain causing, for example, a tilt or warping of the recording disc and resultant cracks in the recording film, due to the shrinking of the adhesive (resin) during the curing thereof.

When a resin composition for adhesion contains a small amount of an acidic material and is in contact with a magneto-optical recording film, a rapid deterioration by oxidation of the magneto-optical recording film containing a rare earth metal such as Tb, Dy, Nd, etc., occurs. This problem is more serious when a thermosetting resin requiring a long curing time or containing a small amount of an acidic material such as phosphoric acid ester in the resin composition to improve adhesion with a metal film such as aluminum, is used.

When using a thermosetting resin requiring a long heat curing time, the transparent plastic substrate is thermally deformed (strain, etc.) and due to shrinkage of the cured resin, the laminated recording medium is tilted or warped and a recording film in contact with the cured resin is subject to a strain which may result in the appearance of cracks in the recording film.

The main object of the present invention is therefore to provide an optical recording medium which resists deterioration by humidity and heat and is stable in a humid atmosphere.

SUMMARY OF THE INVENTION

The above and other objects, features, and advantages of the present invention are realized by providing an optical recording media which comprises: a hard plastic substrate; an optical recording film, particularly a magneto-optical recording film, formed over the hard plastic substrate; and a UV-curable resin layer formed over the optical recording film, wherein the UV-cured resin layer has an acid value of not more than 1.5.

The UV-cured resin layer according to the present invention has an excellent adhesion to a dielectric layer, an optical recording film, or a hard plastic substrate, etc.; can be prepared by a rapid curing without heat, whereby the preparation of this layer does not involve the problems mentioned before with regard to a cold curing resin or a thermosetting resin; and is uniform and resistant to moisture. Accordingly, this UV-cured resin layer will protect an optical recording film including a magneto-optical recording film when exposed to a humid atmosphere.

Therefore, the UV-cured resin layer according to the present invention can be used not only as a protecting layer, per se, formed over a magneto-optical recording film without the adherence of an additional hard plastic substrate on the magneto-optical recording film or the protecting layer, but also as a protecting layer disposed between an optical recording film and an additional hard plastic substrate and over the optical recording film and acting also as an adhesive layer.

The acid value of the UV-cured resin layer is preferably not more than 1.5, more preferably not more than 0.7, most preferably not more than 0.1. The acid value is based on the amount of potassium hydroxide (KOH) in units of milligrams required to neutralize one gram of a sample, i.e., the UV-cured resin. Note, the acid value is expressed without the unit. If the acid value is larger than 1.5, the optical recording film, particularly the magneto-optical recording film, is easily oxidized deteriorated or corroded. For example, when the typical magneto-optical recording medium mentioned before is kept in a hot and humid atmosphere, pin holes appear in the recording medium in an ever-increasing number, the recording medium then becomes transparent, and finally, the recording medium disappears.

The acid value of a resin can be determined by the following method.

A. Liquid resin

A necessary amount of a sample is precisely weighed and charged in a container for titration, into which a gas, e.g., nitrogen gas, not containing carbon dioxide, is introduced. An adequate amount of a solvent (usually an ethanol-water equal volume mixture) is added and heated while stirring to dissolve the sample in the solvent. Phenolphthalein or thymolphthalein as an indicator, and if necessary, water neutradized by boiling, are added. A titration is conducted with an N/100-potassium hydroxide (KOH). The acid value is calculated by the following formula:

$$\text{Acid value} = \frac{V \times N \times 56.108 \times 10^3}{W}$$

where W stands for a weight of the sample in mg, V stands for an amount of used potassium hydroxide solution in ml, and N stands for a normality of the potassium hydroxide solution in N.

B. Cured resin

A cured resin is thoroughly ground and a necessary amount of the ground sample is precisely weighed and charged in a container for titration, into which a gas not containing carbon dioxide is introduced. An adequate amount of a solvent such as an ethanol-water equal-volume mixture is added and refluxed for at least 60 minutes. Phenolphthalein or thymolphthalein and if necessary water neutralized by previously boiling are added. A titration is conducted with N/100-potassium hydroxide. The calculation of the acid value is conducted using the above formula for the liquid resin.

The acidity of the UV-curable resin or UV-cursed resin of the present invention is namely based on free acid groups or sites, particularly free carboxyl groups or sites of acrylate and/or methacrylate ingredients and therefore, the acid values of the UV-curable resin composition or the ingredients thereof can be reduced to a desirable level by removing compounds having acid groups or sites from the acrylates and/or methacrylates. This purification can be carried out by repeated cleaning with purified water or by distillation, depending of the ingredients to be purified.

The UV-cured resin layer preferably has a softening point of not less than 50° C., more preferably not less than 80° C., most preferably not less than 115° C. The term "softening point" of a cured resin layer is defined as "a temperature at which a maximum value of the Young's modulus loss E" is obtained when measured by a DMA 982-type Dynamic Thermomechanical analyzer produced by Du Pont, U.S.A." If the softening point of the cured resin layer is lower than 50° C., the cured resin layer has an insufficient heat resistance and the adhesive force of the cured resin layer in a hot and humid atmosphere is greatly reduced. Further, the repeated instant increase of the temperature caused by irradiation of a laser beam accelerates the fatigue of the cured resin layer and the deterioration thereof over an elapse of time. Therefore, the softening point of a cured resin is preferably not less than 50° C., more preferably not less than 80° C., most preferably not less than 115° C.

The glass transition temperature (Tg) is often used as an indication of the heat resistance of a high molecular weight material, but in the case of a cross-linked high molecular weight material, the unit of movement of the segments has a fairly large distribution, making the change of thermal states (thermal expansion coefficient, etc.), cured by changes of the temperature of the sample, unclear, and it is usually difficult to observe an evident glass transition temperature such as observed in a chain-type high molecular weight material. Accordingly, a ratio of the viscoelasticity of a sample or a high molecular weight material—tan $\delta$ (a ratio of the Young's modulus loss to the Young's modulus)—is sometimes taken as a glass transition temperature Tg. This tan $\delta$, however, is usually higher than Tg, and the deviation of tan $\delta$ increases with a higher temperature as an increase of the measuring frequency, and therefore, the use of tan $\delta$ is not preferable. The softening point defined above in the present invention is utilized in consideration of the above.

A cured resin layer for measuring the softening point thereof was prepared as follows: A liquid UV-curable resin composition was applied on a clean glass plate and uniformly coated thereon with a doctor blade to a thickness of a cured layer of 0.1 to 0.5 mm. The coated resin was then irradiated with UV rays from a high pressure mercury lamp (80 W/cm), from above, to obtain a cured layer. The irradiation time was controlled in accordance with the thickness of the layer, to obtain a sufficiently cured (cross-linked) layer having well-developed physical properties, and a measurement of the softening point thereof was then made.

The UV-cured resin layer having an acid value of not more than 1.5, and preferably, a softening point of not less than 50° C., according to the present invention, is preferably prepared by curing a UV-curable resin composition comprising: a) 15 to 85% by weight of a first ingredient of an acrylate and/or methacrylate having at least three functionalities; b) 15 to 70% by weight of a second ingredient of a compound having a linear structure, having a molecular weight of at least 300 and c) at least 0.3% by weight of a photo polymerization initiator.

The first ingredient of the UV-curable resin composition, i.e., acrylate and/or methacrylate having at least three functionalities, is preferably used in an amount of 15 to 85%, more preferably 20 to 80%, most preferably 25 to 75% by weight based on the total weight of the UV-curable resin composition. If the content of the first ingredient is less than 15% by weight, the degree of cross-linking of the UV-cured resin layer is insufficient, disadvantageously decreasing not only the initial properties of, e.g., the adhesive force, but also the adhesive force in a hot and humid atmosphere. If the content of the first ingredient is more than 85% by weight, the degree of cross linking of the UV-cured resin layer is too high and the layer becomes brittle, and shrinkage of the UV-curable resin layer during curing causes a strain to produce, for example, a tilt or warping of the laminated medium.

The typical first ingredient used in the present invention includes, for example, trimethylolpropane triacrylate and trimethacrylate, tetramethylolmethane triacrylate and trimethylacrylate (the above having three functionalities), tetramethylolmethane tetraacrylate and tetramethacrylate, diacrylate dimethacrylate of an adduct of glycerin and hexamethylene diisocyanate (the above having four functionalities), and dipentaerithritol hexaacrylate and hexamethacrylate (the above having six functionalities).

Triacrylate trimethacrylate having the following formula A can be the first ingredient.

per ethylenically unsaturated bond of the second ingredient is desirably larger, to ensure an increase of the toughness of the UV cured resin layer and to reduce shrinkage during curing. To prevent a partial peeling of the recording film and tilting or warping of the recording medium due to shrinkage of the UV-cured resin layer, as much as possible, the molecular weight of the second compound per ethylenically unsaturated bond is preferably not less than 350, more preferably not less than 1000. The second ingredient having one or more ethylenically unsaturated bonds preferably has a molecular weight of 300 to 3000.

Typical examples of the second ingredient include polyester acrylate and methacrylate, polyether acrylate

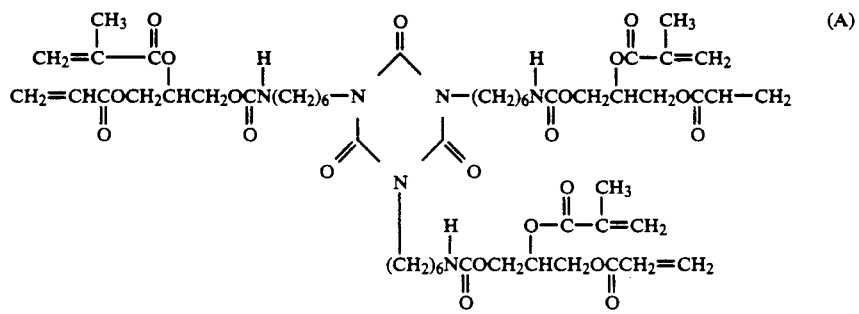

The second ingredient is a compound having a linear structure and having a molecular weight of at least 300.

The linear structure of the compound of the second ingredient is a chain-like main skeleton which may have side chains, as long as the compound as a whole can be considered relatively linear. The linear structure of the second ingredient is necessary to improve the flexibility of the UV-cured resin in combination with the first ingredient which has relatively many linking portions. The second ingredient must have a molecular weight of at least 300, to impart flexibility to the UV-cured resin, and may have an intermediate molecular weight, such as oligomers, or a high molecular weight, such as polymers. Examples of high molecular weight compounds are cellulose, unsaturated polyesters, polyesters, polyamides, polyurethanes, polybuadienes, etc.

and methacrylate, polyurethane acrylate and methacrylate, epoxy acrylate and methacrylate, silicone acrylate and methacrylate. More specifically, the following can be mentioned: polybutyleneadipate diacrylate, polyethylene glycol dimethacrylate, polypropyrene glycol dimethacrylate, diacrylate of polyurethane (from polyester glycol and isocyanate), spiroglycol urethane diacrylate, bisphenol-A epoxy acrylate, bisphenol-F epoxy methacrylate, phenol novolak epoxy acrylate, cresol novolak epoxy acrylate, and polydimethyl siloxane dimethacrylate. One of the most preferable second ingredients is a phenol-based novolak epoxy acrylate or methacrylate, cresol novolak epoxy acrylate or methacrylate, α-naphtol novolak epoxy acrylate or methacrylate, etc. Note, an oligomer represented by the following formula (B) may be used.

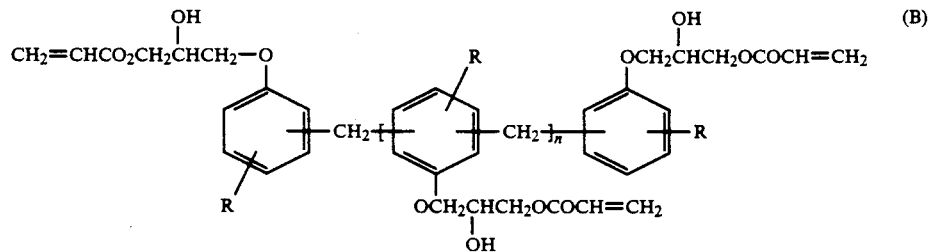

The second ingredient preferably is a photopolymerizable compound having one or more ethylenically unsaturated bonds and has a molecular weight of at least 150, more preferably at least 350, particularly at least 1000 per ethylenically unsaturated bond. Such a compound provides an adequate adhesive force of the resin as well as an adequate flexibility of the rein after curing. If the molecular weight per ethylenically unsaturated bond of the second ingredient is less than 150, the UV cured resin layer has little elongation and is brittle, resulting in a low adhesive force which is further reduced in a hot and humid atmosphere, and thus this UV cured resin layer is not practical. The molecular weight wherein R may be ethyl, isopropyl, t-butyl, benzyl or trifluoromethyl radical. These acrylates are useful second ingredients of the present invention, but other oligomers derived from oligomers such as polyamides, polyurethanes, polyesters, polysulphones, and polyphenyleneoxides by an acrylate modification may be used. The second ingredient may be used alone or as a mixture thereof.

The second ingredient is preferably used in an amount of 15 to 70% by weight, more preferably 20 to 60% by weight, particularly 25 to 55% by weight of the total weight of the UV-curable resin composition. If the content of the second ingredient less than 15% by weight, the cured resin layer has little elongation and is brittle, remarkably reducing the adhesive force at a high temperature and humidity, and the shrinkage of the resin during curing becomes large. If the content of the intermediate molecular weight compound or oligomer is more than 70% by weight, the viscosity of the UV-curable resin composition becomes high and practical handling is difficult, resulting in a nonuniform air-entrained layer.

The UV-curable resin composition described above may further comprise a third ingredient of an acylate and/or methacrylate having one or two functionalities.

The third ingredient is selected from the viewpoint of controlling the viscosity of the UV-curable resin composition and obtaining the optimum physical properties of the UV cured resin layer. Examples of the third ingredient, i.e., the acrylate and methacrylate having one or two function-alities, are ester acrylate, ester urethane acrylate, ether urethane acrylate, epoxy acrylate, and the like.

The third ingredient is preferably used in an amount of at less than 40% by weight, more preferably less than 30% by weight of the total weight of the UV-curable resin composition. If the content of the third ingredient is more than 40% by weight, the toughness of the UV-cured resin layer is lowered, and particularly in the case of the one functionality, the strength and adhesive force of the resin are disadvantageously reduced.

The photopolymerization initiator used in the present invention is not particularly limited and may be any of the conventionally used photopolymerization initiators. Typical initiators are acetophenone, benzophenone, and various derivatives thereof, including the following commercially available initiators: Darocur 1116 and Darocur 1173 (Merck), Vicur 55 (Stauffer), and Irgacur 651 and Irgacur 184 (Ciba-Geigy). Moreover, initiators of benzoin ether types such as benzoin ethyl ether also may be used. The initiators may be used alone or as a mixture thereof.

The amount of the photopolymerization initiator is preferably at least 0.3%, more preferably at least 1.0%, most preferably at least 2.0% by weight of the total weight of the UV-curable resin composition. If the content of the initiator is less than 0.3% by weight, The UV-curable resin composition, is not cured in a desirably short time and the strength of the cured resin becomes low since the density of the cross-linking is not easily increased. Nevertheless, when the UV-curable resin layer is used between two hard plastic substrates, the amount of initiator used may be lower than that appropriate for UV-curable resin layer used only as a protecting layer without a second hard plastic substrate.

The UV-curable resin composition may further contain additives such as a stabilizer and a catalyst or polymerization accelerator.

The UV cured resin layer according to the present invention is used in combination with an optical recording medium, particularly a magneto-optical recording film of an amorphous alloy of rare earth metal(s) and transition metal(s), for example, FeTb-system alloys such as FeTbCo, FeTbGd, FeNd-system alloys, since these alloys, particularly rare earth metals, are easily corroded or very easily deteriorated by oxidation.

The constitution of the magneto-optical recording medium may be the same as that of a conventional magneto-optical recording medium.

In another aspect of the present invention, there is provided a process for manufacturing an optical recording medim, the process comprising the steps of: forming an optical recording film over a hard plastic substrate; coating a UV-curable resin composition over the optical recording film to form a UV-curable resin layer, said UV-curable composition having an acid value of not more than 1.5 and a viscosity of 10 to 5,000 cps at 25° C.; and irradiating the UV-curable resin layer with UV rays to cure the UV-curable resin layer.

The viscosity of the UV-curable resin composition to be coated over the optical recording film is preferably from 10 to 5000 cps at 25° C., more preferably 50 to 2000 cps at 25° C., most preferably 100 to 1000 cps at 25° C. If the viscosity of the composition is less than 10 cps at 25° C., the composition has a high flowability and handling thereof is difficult, in that the composition seeps out during lamination and air may be easily entrained during lamination, so that the workability is reduced. If the viscosity is larger than 500 cps at 25° C., it is difficult to form a uniform thin layer, a large pressure is necessary for the lamination, degassing is difficult if air is once entrained in the composition, and a long time is needed for metering and supplying the composition.

In the UV-curable resin composition has an acid value of not more than 1.5, the acid value of the UV-cured resin layer obtained from the UV-curable composition is always lower than that of the UV-curable resin composition.

DESCRIPTION OF THE PREFERRED EMBODIMENTS

The present invention is further described with reference to a magneto-optical recording medium. Note, the present invention is not limited to the exemplified mediums.

Figure 1:
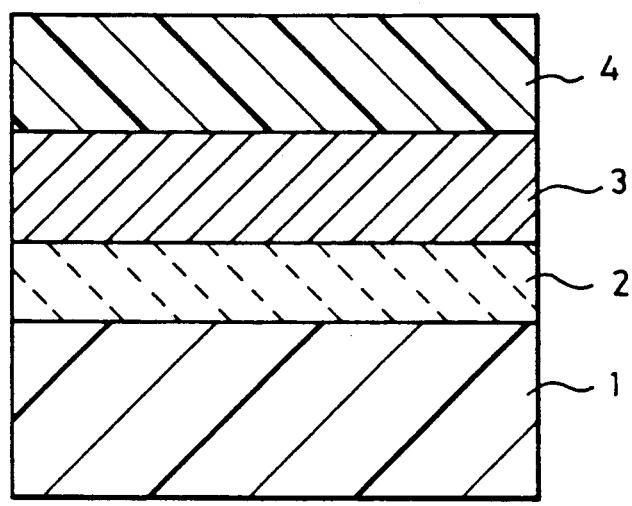
FIGS. 1 to 4 are sectional views of the structures of various magneto-optical recording mediums.
Figure 2:
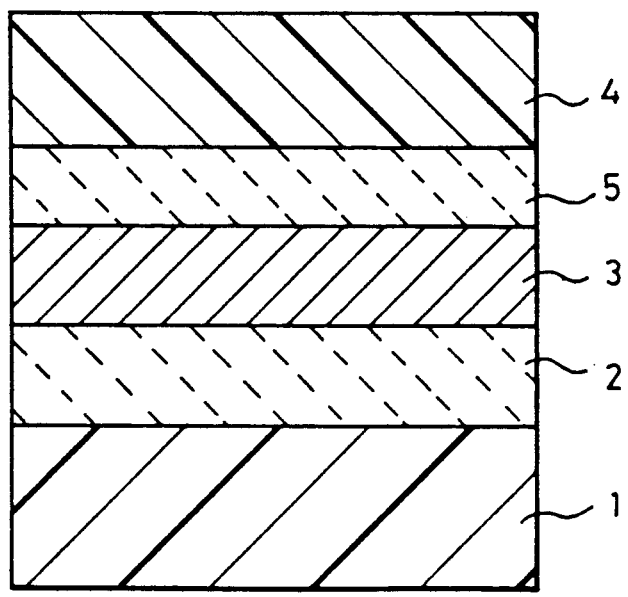

FIGS. 1 and 2 show magneto-optical recording mediums in which a UV-cured resin layer is used as an organic protecting layer without a hard plastic substrate thereon. In FIG. 1, reference numeral 1 denotes a transparent hard plastic substrate, on which a dielectric layer (an inorganic protecting layer) 2 and a magneto-optical recording film 3 are formed, and an organic protecting layer 4 is formed on the recording film 3. The organic protecting layer 4 is the UV cured resin layer of the present invention. In FIG. 2, another dielectric layer (an inorganic protecting layer) 5 is formed between the recording layer 3 and the organic protecting layer 5 of the recording medium shown in FIG. 1.

The organic protecting layer 4, i.e., a UV cured resin layer according to the present invention, is generally formed by spin coating, or by roll coating on the recording film 3 or the dielectric layer 5, which are formed by sputtering or the like. The thickness of the organic protecting layer 4 is preferably 0.5 to 1000 μm, more preferably 2 to 300 μm, most preferably 5 to 100 μm.

The coated UV-curable resin layer 4 is then irradiated with UV rays by an appropriate UV source, for example, a high pressure mercury lamp, super high pressure mercury lamp, metal halide lamp, and xenon lamp, and thus the UV-curable resin layer is cured and becomes a UV cured resin layer acting as an organic protecting layer.

The constitution of the magneto-optical recording medium is not particularly limited, except for the organic protecting layer, and may be the same as that of conventional medium. For example, the transparent hard plastic substrate may be of polycarbonate resin or acrylic resin, etc.; the dielectric layer may be of ZnS, $SiO_2$, AlN, $Si_3N_4$, or $In_2O_3$, etc.; the magneto-optical recording film may be of a TbFe-system alloy such as TbFeCo and TbFeGd, a NdFe-system alloy such as NdFeCo, or NdDyFeCo alloy. Further, a metal layer of titanium, aluminum or the like may be inserted, as a reflecting layer or an inorganic layer as a protection against oxidation. The dielectric layer, magneto-optical recording film, and metal layer are formed by a conventional method of physical deposition, such as sputtering or evaporation.

Figure 3:
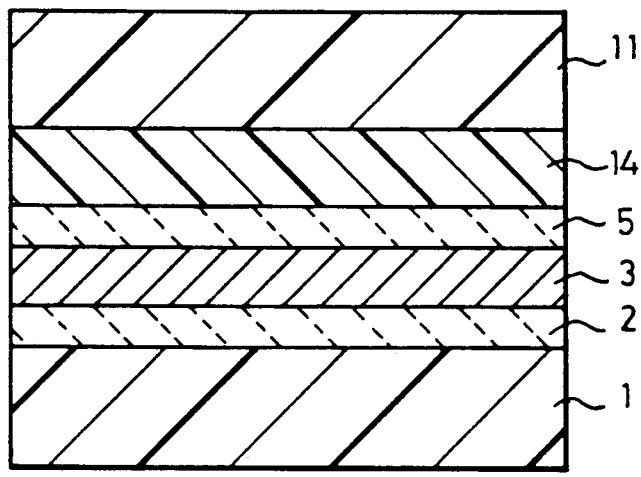

FIG. 3 shows another embodiment of a magneto-optical recording medium of the laminated substrate type (one side recording medium). In FIG. 3, another transparent hard plastic substrate 11 is provided on the UV cured resin layer 14 of a magneto-optical recording medium shown in FIG. 2 and is adhered to the recording medium by the UV cured resin layer 14 per se. In this embodiment, the UV-cured resin layer 4 acts as an adhesive layer as well as a protecting layer for the recording film in a hot and humid atmosphere. Note, at least the outer periphery of the UV-cured resin layer is exposed to the atmosphere.

The thickness of the UV cured resin layer of the embodiment of the recording medium shown in FIG. 3 is preferably 5 to 1000 $\mu$m, more preferably 10 to 500 $\mu$m.

Figure 4:
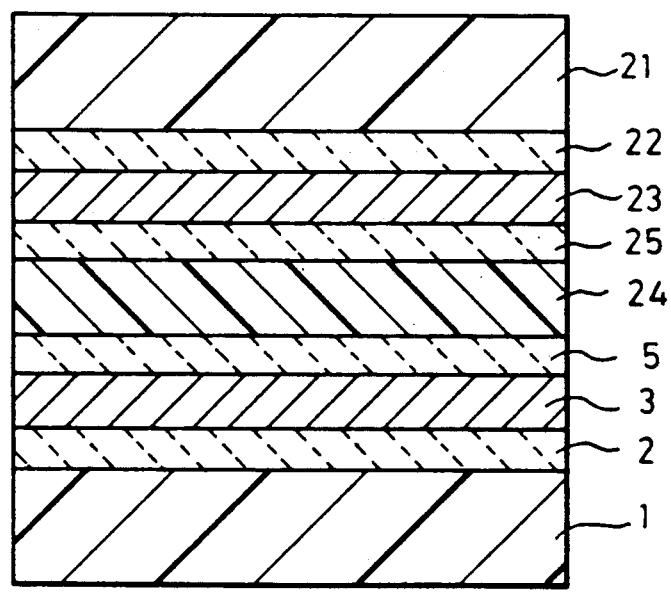

FIG. 4 shows a further embodiment of a magneto-optical recording medium in which two recording films provided over a transparent hard plastic substrate are laminated with an adhesive layer (double sided recording medium). In FIG. 4, a transparent hard plastic substrate 21, a dielectric layer 22, a magneto-optical recording film 23, and a dielectric layer 25 are similar to a transparent hard plastic substrate 1, a dielectric layer 2, a magneto-optical recording film 3 and a dielectric layer 5, respectively. Reference numeral 24 denotes a UV-cured resin layer which joins the dielectric layers 5 and 25. The function and the thickness of the UV-cured resin layer 24 are substantially the same as those of the UV-cured resin layer in FIG. 3.

When adhering the second transparent hard plastic substrate 11 to the dielectric layer 5, only a UV irradiation of the UV-curable resin layer 14 from the side of the substrate 11 will obtain a well-cured resin layer. But, when curing the UV-curable resin layer 24 of the double sided recording medium shown in FIG. 4, the recording films 3 and 23 are not sufficiently transparent to allow the UV rays to be easily transmitted therethrough, and therefore, the curing is effected mainly by UV rays passing through the outer and inner peripheries of the recording medium where the recording film is not present, and thus a longer time is needed for the curing. An acceleration of the curing is made possible by previously coating a primer liquid containing a photopolymerization catalyst on the surfaces of the dielectric layers 5 and/or 25, followed by applying the UV-curable resin composition on the primer layer and curing the composition with UV rays. The catalyst used may be, for example, a peroxide such as benzoyl peroxide, a metallic ion such as iron, nickel ions, or an oxidation-reduction type catalyst.

EXAMPLES 1 TO 6

Magneto-optical recording mediums were prepared having the structures shown in FIG. 2, in which reference numeral 1 denotes a transparent plastic substrate, 2 a dielectric layer, 3 a magneto-optical recording film, 4 an organic protecting layer, and 5 an inorganic protecting layer.

A polycarbonate (PC) disc-like substrate having a diameter of 130 mm and thickness of 1.2 mm and having grooves cut at a 1.6 $\mu$m pitch was mounted in a vacuum chamber of an Rf magnetron sputtering device (ANELVA Corporation SPF-430) capable of mounting three targets, and the chamber was evacuated to less than $4 \times 10^{-7}$ Torr. The substrate was cooled by water and rotated at 15 rpm.

Argon gas was introduced into the chamber and the flow of the argon gas was regulated to a pressure of $1.1 \times 10^{-2}$ Torr in the chamber. First, a ZnS layer (75 $\mu$m thick) as the dielectric layer 2 was deposited by Rf sputtering, using a target of a ZnS disc having a diameter of 100 mm and a thickness of 5 mm and an electrical discharge at a power of 100 W and an Rf of 13.56 MHz. Then, using a target of $Tb_{23}Fe_{69}Co_8$ alloy and an argon gas atmosphere, a TbFeCo alloy film (80 $\mu$m) thick) as a recording film 3 was deposited by the same discharge conditions as above. Further, using a target of AlN and an argon gas atmosphere, an AlN layer (50 nm thick) as an inorganic protecting layer 5 was deposited.

A UV-curable resin layer 4 was spin-coated on the inorganic protecting layer 5 to a uniform thickness of about 10 $\mu$m. The UV-curable resin layer had the composition shown Table 1.

The coated UV-curable resin layer 4 was irradiated with UV rays by a 80 W/cm high pressure mercury lamp from the side of the exposed surface of the UV-curable resin layer 4, and thus a magneto-optical recording medium as shown in FIG. 2 was obtained.

The resultant recording medium was subject to an accelerated deterioration test at 60° C. and 90% RH.

Further, the softening points of the UV-curable resin as shown in Table 1 were measured, and the measurements were conducted in the same manner as previously described.

The results are shown in Table 1. Examples 1 to 3 are according to the present invention and Examples 4 to 6 are Comparative. In Example 5, an organic protecting layer was not formed on a magneto-optical recording film. In Example 6, a commercially available UV-curable resin VDAL-378, produced by a Dainichiseika K.K., was used to form an organic protecting layer on a magneto-optical recording film. In Tables 1 to 7, the ingredients of compositions of comparative Examples do not exactly fall into the definitions of the ingredients of the composition of the present invention and are shown in columns that roughly correspond or do not correspond to the ingredients of the present invention. In Tables, the unit "PHR (Parts per Hundred Resin)" of the photopolymerization initiator is an amount of the initiator added per 100 parts of the resin. The chemical formulas and abbreviations of the second ingredients (referred to as "oligomer"), the acrylates and methacrylates, and the initiators are shown as follows.

CHEMICAL FORMURAE OF OLIGOMERS

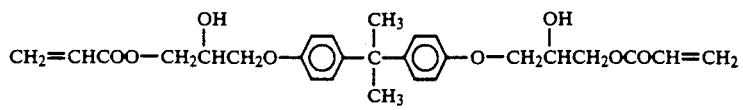

Bisphenol-A-epoxy acrylate

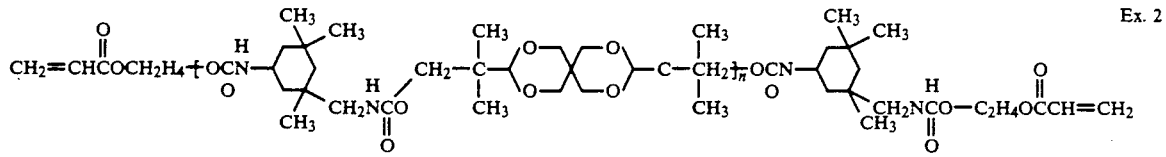

n = 3
Spiro-glycol urethane acrylate

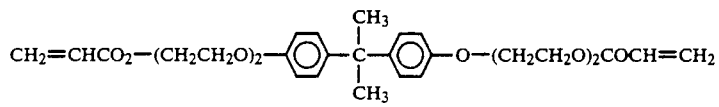

Bisphenol-A-ether acrylate
(adduct of four moles of ethylene glycol)
[Abbreviated as "Bisphenol-A-ether acrylate (4)"]

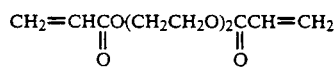

Diethylene glycol diacrylate

ACRYLATE OR METHACRYLATE HAVING AT LEAST THREE FUNCTIONALITIES

TMPTA: Trimethylol propane triacrylate

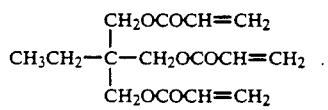

DPEHA: Dipentaerithritol hexaacrylate

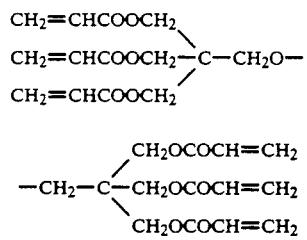

ACRYLATE OR METHACRYLATE HAVING LESS THAN THREE FUNCTIONALITIES

NPG—DA: Neopentyl glycol diacrylate

ACRYLATE OR METHACRYLATE HAVING LESS THAN THREE FUNCTIONALITIES

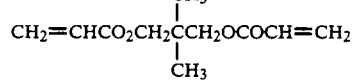

HD—DM: 1,6-Hexanediol dimethacrylate

PHOTOPOLYMERIZATION INITIATOR

D: Darocur 1173 (Merck Ltd.)
E: Darocur 1116 (Merck Ltd.)
V: Vicur 55 (Stauffer Chemical Com.)
B: Benzophenone (Wakoh Junyaku K.K.)

OTHER ABBREVIATIONS

Second ingredient: Oligomer
(Meta)Acrylate: Acrylate or Methacrylate
(Meta)Acrylate (1): Acrylate or methacrylate having at least three functionalities
(Meta)Acrylate (2): Acrylate or methacrylate having less than three functionalities
Initiator: Photopolymerization initiator

TABLE 1

| | EXAMPLES 1 TO 6 | | | | | |
|---|---|---|---|---|---|---|
| | Oligomer | | | (Metha)Acrylate (1) | | (Metha)Acrylate (2) |
| Ex. | Molecular | Molecular weight per ethylenically unsaturated bond | Amount (wt %) | | Amount (wt %) | | Amount (wt %) |
| 1 | Bisphenol-A-epoxy acrylate | 242 | 50 | TMPTA | 30 | NPG-DA | 20 |
| 2 | Spiro-glycol urethane | 1,016 | 30 | TMPTA | 40 | NPG-DA | 30 |

TABLE 1-continued

EXAMPLES 1 TO 6

|   | acrylate | | | | | | |
|---|---|---|---|---|---|---|---|
| 3 | Bisphenol-A-ether acrylate (4) | 256 | 50 | DPEHA | 35 | NPG-DA | 15 |
| 4* | Diethylene glycol di-acrylate | 107 | 40 | TMPTA | 40 | NPG-DA | 20 |
| 5* | No organic protecting layer | | | | | | |
| 6* | VDAL-378 (UV resin produced by Dainichiseika K.K.) | | | | | | |

|    |                    |                              |             |                         | Evaluation |   |
|----|--------------------|------------------------------|-------------|-------------------------|---|---|
|    |                    |                              |             |                         | Durability of Medium 60° C., 90% RH 1000 hr | |
| Ex. | Initiator (PHR) | Viscosity at 25° C. (cps) | Acid value | Softening point (°C.) | Tilt or warp of medium | State of recording film |
| 1 | D3.0 | 790 | 0.8 | 115 | Non ○ | No deterioration ○ |
| 2 | E3.0 | 900 | 0.6 | 131 | Non ○ | No deterioration ○ |
| 3 | D2.5 V0.5 | 390 | 0.3 | 83 | Non ○ | No deterioration ○ |
| 4* | B2.0 V2.0 | 36 | 2.3 | <20 | Large x | Deteriorated x |
| 5* | — | — | — | — | — | Remarkable deterioration xx |
| 6* | | 95 | 19.4 | <20 | Large | Remarkable deterioration xx |

*Examples 4, 5 and 6 were comparative.

As seen from Table 1, in Examples 1 to 3, the acid values of the UV-curable resin composition, and thus the UV-cured resin layer, were low and, therefore, oxidation deterioration of the recording film was prevented and there was little deterioration even after the accelerated test at 60° C. and 90% RH for 1000 hours. In contrast, in Example 6 (comparative), since the acid value of the UV-cured resin layer was high, the recording film was remarkably deteriorated. Further, in Examples 1 to 3, the softening points of the UV-cured resin layers were higher than 50° C. and the resulting durability of the recording mediums in a hot and humid atmosphere was good. Namely, after 1000 hours exposure to an atmosphere at 60° C. and 90% RH, the mediums were not warped and deterioration of the recording film, such as pin holes and corroded holes was not observed. In contrast, in Example 4 (comparative) in which the oligomer had a molecular weight per acryloyl radical i.e., per ethylenically unsaturated bond of as small as 107 and a softening point lower than 20° C., serious warping of the recording medium occurred and the recording film was remarkably deteriorated by oxidation after exposure to a hot and humid atmosphere.

EXAMPLES 7 TO 10

In the same manner as for Examples 1 to 3, a 65 nm thick dielectric layer 2 of $In_2O_3$, a 50 nm thick magneto-optical recording film 3 of TbFeCo, and a 55 nm thick inorganic protecting and reflecting layer 5 of Ti, were formed on a transparent hard plastic substrate 1. A UV-cured resin layer 4 as an organic protecting layer was formed from a composition shown in Table 2 and by an irradiation of UV rays, and thus the magneto-optical recording mediums as shown in FIG. 2 were obtained.

The obtained recording mediums were subjected to the acceleration test and the softening points of the UV-curable compositions shown in Table 2 also were measured.

The C/N ratio was measured using a magneto-optical memory analyser (Nakamichi OMS-1000 type-III) by rotating the medium at 900 r.p.m., recording signals of 1.024 MHz with a 5.0 mW semiconductor laser beam and then reading the signals with a 0.8 mW semiconductor laser beam. The applied magnetic field was 500 Oe.

The results are shown in Table 2.

The chemical formulae and abbreviations of the ingredients are as follows, or are the same as those shown previously.

CHEMICAL FORMURAE OF OLIGOMERS

Ex. 7

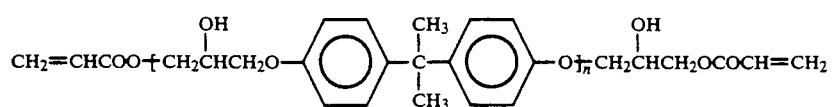

n = 2
Bisphenol-A-epoxy acrylate

CHEMICAL FORMURAE OF OLIGOMERS -continued

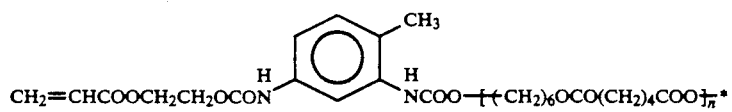

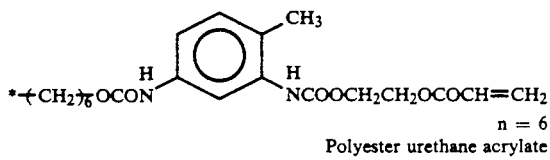

n = 6
Polyester urethane acrylate

Ex. 8

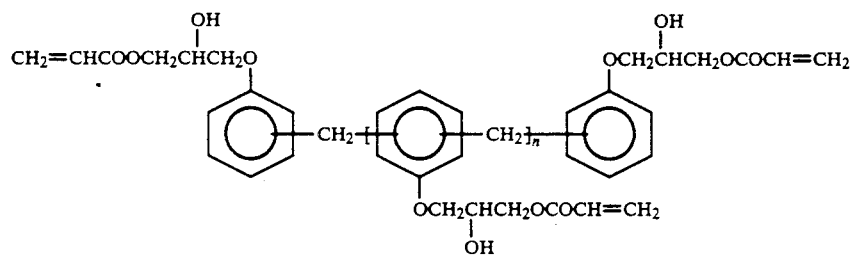

n = 3
Phenol novolak epoxy acrylate

Ex. 9

$CH_2=CHCOOCH_2\overset{CH_3}{\underset{|}{CH}}OCH_2\overset{CH_3}{\underset{|}{CH}}OCOCH=CH_2$ Dipropylene glycol diacrylate Ex. 10

(META)ACRYLATE (1)

U-4HA: Urethane dimethacrylate diacrylate

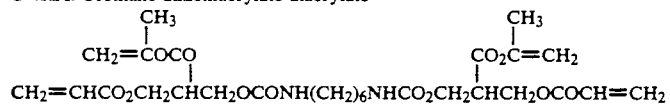

TABLE 2
EXAMPLES 7 TO 10

| Ex. | Oligomer | Molecular weight per ethylenically unsaturated bond | (wt %) | (Metha)acrylate (1) | (wt %) | (Metha)acrylate (2) | (wt %) |
|---|---|---|---|---|---|---|---|
| 7 | Bisphenol-A-epoxy acrylate | 384 | 40 | TMPTA | 35 | MPG-DA | 25 |
| 8 | Polyester urethane acrylate | 1,025 | 25 | u-4HA TMPTA | 40 15 | NPG-DA | 20 |
| 9 | Phenol novolac epoxy acrylate | 232 | 38 | TMPTA | 42 | NPG-DA | 20 |
| 10* | Dipropylene glycol diacrylate | 121 | 40 | TMPTA | 45 | Ethylene glycol dimethacrylate | 15 |

| | | | | | Evaluation | | |
|---|---|---|---|---|---|---|---|
| | | | | | | C/N (dB) | |
| Ex. | Initiator (PHR) | Viscosity at 25° C. (cps) | Acid value | Softening point (°C.) | Tilt or warping | Initial value | 60° C. 90% RH 1000 hr |
| 7 | D2.5 B0.5 | 920 | 0.5 | 128 | none ○ | 51 | 50.5 |
| 8 | E3.0 | 1260 | 1.0 | 61 | none ○ | 50 | 49 |
| 9 | D3.0 | 830 | 0.08 | 81 | none ○ | 52 | 51 |
| 10* | B0.5 | 30 | 1.9 | <20 | large | 52 | 44 |

TABLE 2-continued

| EXAMPLES 7 TO 10 |  |
|---|---|
| V2.5 | x |

*Example 10 was Comparative.

As seen from Table 2, the recording mediums of Examples 7 to 9 exhibited an excellent durability in a hot and humid atmosphere, due to a high softening point of the UV-cured resin layer, and deterioration of the recording film was not observed after an acceleration test at 60° C. and 90% RH for 1000 hours. In contrast, in Examples 10 in which the oligomer had a molecular weight per acryloyl radical of 121, tilting or warping of the recording medium occurred due to shrinkage of the curable resin layer by curing, and further, since the UV-cured resin layer had a low softening point of 20° C. in Example 10, the recording film showed a large degree of deterioration in the durability test.

EXAMPLES 11 TO 13

In the same manner as for Examples 1 to 3, an 80 nm thick dielectric layer 2 of $Si_3N_4$ and a 60 nm thick magneto-optical recording film 3 of NdDyFeCo were deposited from a target of Si and a target of $Nd_7Dy_{23}Fe_{56}Co_{14}$ alloy, respectively, but an inorganic protecting layer 5 was not formed. A UV-curable resin layer 4 prepared from the compositions shown in Table 3 was formed on the recording film 3.

The evaluation was carried out in the same manner as for Examples 1 to 3, and the results are shown in Table 3.

The chemical formulae of the oligomers used are as follows:

CHEMICAL FORMURAE OF OLIGOMERS

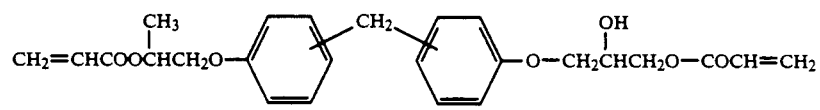

Bisphenol-F-epoxy acrylate

Ex. 11

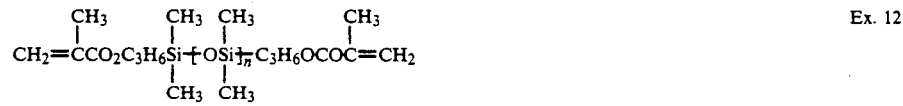

n = 19
Polydimethyl siloxane methacrylate

Ex. 12

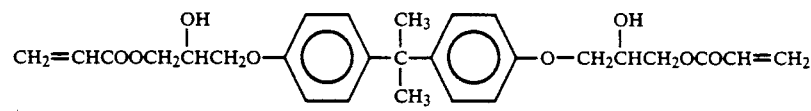

Bisphenol-A-epoxyacrylate

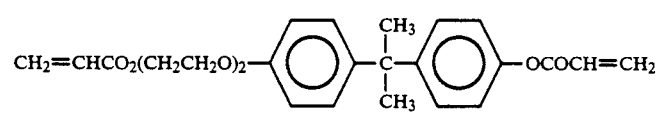

Bisphenol-A-ether acrylate
(Adduct of 2 moles ethylene glycol)
[Abbreviated as bisphenol-A-ether acrylate (2)]

Ex. 13

TABLE 3

| | | Oligomer | | | | | |
|---|---|---|---|---|---|---|---|
| Ex. | | Molecular weight per ethylenically unsaturated bond | (wt %) | (Metha)Acrylate (1) | (wt %) | (Metha)Acrylate (2) | (wt %) |
| 11 | Bisphenol-F-epoxy acrylate | 191 | 50 | TMPTA | 30 | Bisphenol-A-ethylene oxide adduct diacrylate | 10 |
| | | | | | | NPG-DA | 10 |
| 12 | Polydimethyl siloxane methacrylate | 900 | 15 | TMPTA | 45 | NPG-DA | 20 |
| | Bisphenol-A-epoxy acrylate | 242 | 35 | | | | |
| 13* | Bisphenol-A-ether acrylate (2) | 212 | 50 | TMPTA | 10 | BD-DM | 40 |

TABLE 3-continued

EXAMPLES 11 TO 13

| Ex. | Initiator (PHR) | Viscosity at 25° C. (cps) | Acid value | Softening point (°C.) | Evaluation Durability of Medium 60° C., 90% RH 1000 hr | |
|---|---|---|---|---|---|---|
| | | | | | Tilt or warping | State of recording film |
| 11 | D2.5 B0.5 | 1080 | 0.9 | 59 | none ○ | No deterioration ○ |
| 12 | D2.0 B0.5 | 120 | 0.5 | 90 | none ○ | No deterioration ○ |
| 13* | V2.5 E1.0 | 80 | 3.0 | 39 | intermediate Δ | Deterioration x |

*Example 13 was Comparative.
TMPTA: Trimethylol propane triacrylate

As apparent from Table 3, in Examples 11 and 12, the softening points of the UV-cured resin layers were higher than 50° C. and the durability of the mediums in a hot and humid atmosphere was good. Namely, tilt or warping of the medium and deterioration of the recording film were not observed after exposure to an atmosphere at 60° C. and 90% RH for 1000 hours. In Example 13, only 10% by weight of trimethylol propane triacrylate (TMPTA) was contained in the UV-curable resin composition as an acrylate and/or methacrylate having at least three functionalities, whereby the degree of cross linking, and thus the initial adhesive force, were lowered. Further, the softening point of the UV-cured resin was lower than 50° C., and as a result, tilt or warping of the medium and deterioration of the recording film were observed after the durability test and accelerated test.

EXAMPLES 14 TO 19

A 65 nm thick dielectric layer 2 of ZnS, an 80 nm thick magneto-optical recording film 3 of TbFeCo, and a 50 nm thick inorganic protecting layer 5 of AlN were deposited in that order on a transparent hard plastic substrate 1 of polycarbonate, and then a UV-curable resin composition as shown in Table 4 was spin-coated on the inorganic protecting layer 5 to form an adhesive layer 14 having a thickness of about 50 μm, on which a mere transparent hard plastic substrate 11 of polycarbonate was superimposed on the adhesive layer 14 while taking care not to entrain air, and to ensure that at least the outer periphery of the recording film 3 was covered by the UV-curable resin composition.

UV rays were irradiated to the adhesive layer 14 of the UV-curable resin composition from the side of the transparent substrate 11, by a 80 W/cm high pressure mercury lamp as the UV source, and thus a magneto-optical recording medium having a structure as shown in FIG. 3 (single sided recording medium) was obtained.

The accelerated deterioration test of the medium and the measurement of the softening point of the UV-cured resin of the composition shown in Table 4 were carried out in the same manner as for Examples 1 to 3.

In Table 4, the oligomers used in Examples 14 to 19 were the same as the oligomers used in Examples 1 to 3, 11, 4, and 13. The abbreviations of the ingredients are the same as in the previous Examples.

TABLE 4

EXAMPLES 14 TO 19

| Ex. | Oligomer | Molecular weight per ethylenically unsaturated bond | (wt %) | (Metha)Acrylate (1) | (wt %) | (Metha)Acrylate (2) | (wt %) |
|---|---|---|---|---|---|---|---|
| 14 | Bisphenol-A-epoxy acrylate | 242 | 51 | TMPTA | 29 | NPG-DA | 20 |
| 15 | Spiro-glycol urethane acrylate | 1,016 | 30 | TMPTA | 70 | — | — |
| 16 | Bisphenol-A-ether acrylate (4) | 256 | 50 | DPEHA | 40 | NPG-DA | 10 |
| 17 | Bisphenol-F-epoxy acrylate | 191 | 50 | TMPTA | 30 | Bisphenol-A-ethylene oxide adduct diacrylate NPG-DA | 10 10 |
| 18* | Diethylene glycol diacrylate | 107 | 40 | TMPTA | 40 | NPG-DA | 20 |
| 19* | Bisphenol-A-ether acrylate (2) | 212 | 50 | TMPTA | 10 | HD-DM | 40 |

| Evaluation |
|---|
| Durability of medium 60° C., 90% RH, 1000 hr |

TABLE 4-continued

EXAMPLES 14 TO 19

| Ex. | Initiator (PHR) | Viscosity at 25° C. (cps) | Acid value | Softening point (°C.) | Tilt or warping | Adhesion | State of recording film |
|---|---|---|---|---|---|---|---|
| 14 | D1.0 | 830 | 0.7 | 118 | None ○ | Firmly adhered ○ | No deterioration ○ |
| 15 | D1.0 V0.5 | 2200 | 0.4 | 135 | None ○ | Firmly adhered ○ | No deterioration ○ |
| 16 | D1.0 V0.5 | 450 | 0.3 | 85 | None ○ | Firmly adhered ○ | No deterioration ○ |
| 17 | D1.0 B0.5 | 1080 | 0.9 | 59 | Little ○ | Firmly adhered ○ | No deterioration ○ |
| 18* | B2.0 | 36 | 2.0 | <20 | Large x | Peeled x | Deterioration x |
| 19* | D1.0 V1.0 | 90 | 2.2 | 40 | Slight Δ | Partially peeled x | Deterioration x |

*Examples 18 and 19 were Comparative.

As apparent from Table 4, in Examples 14 to 16, the acid values of the UV-cured resin layers were lower than 1.5, the softening points were higher than 50° C., and the durability of the mediums in a hot and humid atmosphere was good. More specifically, after 1000 hours at 60° C. and 90% RH, the mediums were not tilted or warped, the adhesions were firm, and peeling was not observed, and as a result, deterioration such as pin holes or corrosion holes were not observed in the recording films.

In comparison, in Example 18, the oligomer had a low molecular weight per acryloyl radical of 107 and a softening point lower than 20° C. Therefore, in the durability test in hot and humid atmosphere, serious tilt or warping of the medium occurred and the adhered film was peeled off, resulting in a remarkable oxidation deterioration of the recording film.

In Example 19, since only 10% by weight of trimethylol propane triacrylate was contained as an acrylate having at least three functionalities, the degree of cross-linking of the cured layer was low and thus the initial adhesive force was reduced. In addition, the softening point of the cured layer was low, at 40° C., i.e., lower than 50° C., and as a result, the hot and humid atmosphere deterioration test caused a partial peeling of the medium and deterioration of the recording film.

EXAMPLES 20 TO 24

The procedures of Examples 14 to 17 were repeated except that the dielectric layer 2 (65 nm thick $In_2O_3$), the magneto-optical recording film 3 (50 nm thick TbFeCo) the inorganic protecting layer 5 (55 nm thick Ti), and the adhesive layer had the UV-curable resin composition as shown in Table 5. A single sided recording medium as shown in FIG. 3 was manufactured.

The accelerated deterioration test and a measurement of the softening point were carried out in the same manner as for Examples 14 to 17. The results are shown in Table 5.

The chemical formulae of the oligomer used in Examples 20 to 24 are the same as those of Examples 7, 8, 12, 9 and 10, respectively.

TABLE 5

EXAMPLES 20 TO 24

| Ex. | Oligomer | Molecular weight per ethylenically unsaturated bond | (wt %) | (Metha)Acrylate (1) | (wt %) | (Metha)Acrylate (2) | (wt %) |
|---|---|---|---|---|---|---|---|
| 20 | Bisphenol-A-epoxy acrylate | 384 | 40 | TMPTA | 40 | NPG-DA | 20 |
| 21 | Polyester urethene acrylate | 1,025 | 25 | u-4HA TMPTA | 40 25 | NPG-DA | 10 |
| 22 | Polydimethyl siloxane methacrylate | 900 | 15 | TMPTA | 45 | NPG-DA | 20 |
|  | Bisphenol-A-epoxy acrylate | 242 | 35 |  |  |  |  |
| 23 | Phenol novolak epoxy acrylate | 232 | 38 | TMPTA | 42 | NPG-DA | 20 |
| 24* | Dipropylene glycol diacrylate | 121 | 40 | TMPTA | 45 | Ethylene glycol dimethacrylate | 15 |

| Ex. | Initiator (PHR) | Viscosity at 25° C. (cps) | Acid value | Softening point (°C.) | Tilt or warping | Adhesion | State of recording film |
|---|---|---|---|---|---|---|---|

Evaluation — Durability of medium 60° C., 90% RH, 1000 hr

TABLE 5-continued

| | | EXAMPLES 20 TO 24 | | | | | |
|---|---|---|---|---|---|---|---|
| 20 | D1.0 B0.5 | 1010 | 0.5 | 130 | None ○ | Firmly adhered ○ | No deterioration ○ |
| 21 | V1.0 D1.0 | 1390 | 1.1 | 63 | None ○ | Firmly adhered ○ | No deterioration ○ |
| 22 | V1.0 D0.5 B0.5 | 120 | 0.5 | 90 | None ○ | Firmly adhered ○ | No deterioration ○ |
| 23 | D1.0 | 870 | 0.07 | 81 | None ○ | Firmly adhered ○ | No deterioration ○ |
| 24* | D1.0 B0.5 | 35 | 1.8 | <20-Large | Peeled x | Deterioration x | Deterioration x |

*Example 24 was Comparative.

As apparent from Table 5, in Examples 20 to 23, the softening points of the UV-cured resins layers were higher than 50° C. and the results of the durability of the recording mediums in a hot and humid atmosphere were good. More specifically, after 1000 hours at 60° C. and 90% RH, the adhesion was firm with no peeling and deterioration of the recording film did not occur.

In contrast, in Example 24, the oligomer had a molecular weight per acryloyl radical of 121, and thus the UV-curable resin layer shrunk during the curing, causing an unpractical serious tilt or warping of the medium. Further, since the softening point of the UV-cured resin layer was lower than 20° C., the durability test in an atmosphere at 60° C. and 90% RH caused a peeling of the adhesive layer and deterioration of the recording film.

EXAMPLES 25 TO 29

The procedures of Examples 20 to 23 were repeated using a UV-curable composition as shown in Table 6, to form the magneto-optical recording mediums shown in FIG. 3.

The accelerated deterioration test of the mediums and the measurement of the softening points of the UV-cured resin layers were carried out in the same manner as for Examples 20 to 23.

The results are shown in Table 6.

TABLE 6

| | | Oligomer | | (Metha)Acrylate (1) | | (Metha)Acrylate (2) | |
|---|---|---|---|---|---|---|---|
| Ex. | | Molecular weight per ethylenically unsaturated bond | Amount (%) | | Amount (%) | | Amount (%) |
| 25 | Phenol novolak epoxy acrylate | 232 | 25 | TMPTA | 50 | NPG | 25 |
| 26 | Bisphenol-A-ether acrylate (4) | 256 | 30 | Tetramethylol methane triacrylate | 10 | NPG | 25 |
| | | | | TMPTA | 10 | HD-DA | 25 |
| 27 | Cresol novolak epoxy acrylate | 244 | 25 | DPEHA | 20 | NPG | 30 |
| | | | | TMPTA | 10 | Triethylene glycol diacrylate | 15 |
| 28* | 2,2-bis[4-(methacryloxy diethoxy) phenyl]propane | 280 | 35 | | | Hexandiol dimethacrylate | 15 |
| | Diethylene glycol diacrylate | 107 | 30 | | | 3-phenoxy-2-hydoxy propyl acrylate | 20 |
| 29* | 2,2-bis[4-methacryloxy ethoxy) phenyl]propane | 226 | 35 | | | HD-DA | 10 |
| | 2,2-bis[4-(acryloxy diethoxy) phenyl]propane | 256 | 20 | | | 3-phenoxy-2-hydroxy propyl acrylate | 20 |
| | | | | | | NPG-DA | 15 |

| | | | | | Evaluation | |
|---|---|---|---|---|---|---|
| | | | | Softening | Detorioration Test | |
| Ex. | Initiator (PHR) | Viscosity at 25° C. (cps) | Acid value | point (°C.) | Recording film | Adhesion |
| 25 | E1.0 | 190 | 0.3 | 77 | Little deterioration after | Little decrease after 1,000 |
| 26 | D1.0 | 40 | 1.3 | 80 | | |

TABLE 6-continued

| | | EXAMPLES 25 TO 29 | | | | |
|---|---|---|---|---|---|---|
| 27 | D1.5 | 320 | 0.7 | 90 | 1,000 hours | hours |
| 28* | V1.5 | 60 | 15.2 | <20 | Deterioration appeared after 100 hours | Large decrease after 100 hours |
| 29* | D0.5 V1.0 | 170 | 3.8 | <20 | Deterioration appeared after 300 hours | Large decrease after 300 hours |

*Examples 28 and 29 were comparative.

As apparent from Table 6, in Examples 25 to 27, the acid values of the UV-cured resin layers were so low that oxidation deterioration of the recording film in a hot and humid atmosphere was prevented and little deterioration appeared after 1000 hours at 60° C. and 90% RH.

In contrast, in Examples 28 to 29, the acid values of the UV-cured resin layers were 15.2 and 3.8, respectively, and thus were high that the recording films were rapidly oxidized after 100 hours and 300 hours, and the resulting damage to the recording films made usage thereof impossible.

In Examples 28 to 29, acrylate and/or methacrylate having one or two functionalities only were used, and acrylate and/or methacrylate having at least three functionalities were used in Examples 25 to 27 according to the present invention. As a result, the adhesive force of the UV-cured resin layer was lower in Examples 28 to 29 than in Examples 25 to 27, particularly in a hot and humid atmosphere.

EXAMPLES 30 TO 33

The procedures of Examples 20 to 23 were repeated using a UV-curable composition as shown in Table 7 to form magneto-optical recording mediums as shown in FIG. 3.

The accelerated deterioration test of the mediums and the measurement of the softening points of the UV-cured resin layers were carried out in the same manner as for Examples 20 to 23.

TABLE 7

| | | EXAMPLES 30 TO 33 | | | | | |
|---|---|---|---|---|---|---|---|
| | | Oligomer | | (Metha)Acrylate (1) | | (Metha)Acrylate (2) | |
| Ex. | | Molecular weight per ethylenically unsaturated bond | Amount (%) | | Amount (%) | | Amount (%) |
| 30 | Bisphenol-A-epoxy acrylate | 242 | 35 | Tetramethylol methone triacrylate | 30 | NPG | 20 |
| | | | | TMPTA | 15 | | |
| 31 | Cresol novolak epoxy diacrylate | 244 | 25 | TMPTA | 35 | NPG | 20 |
| | Phenol novolak epoxy polyacrylate | 232 | 20 | | | | |
| 32* | Diethylene glycol diacrylate | 107 | 40 | — | | Neopenthyl glycol dimethacrylate | 35 |
| | | | | | | Ethylene glycol dimethacrylate | 25 |
| 33* | Bisphenol-A-urethane diacrylate | 370 | 25 | — | | 2,2-bis[4-(acryloxy polypropoxy) phenyl] propane | 30 |
| | Urethane acrylate [Photomer 6827 Sanopco] | | 30 | | | 3-phenoxy-2-hydroxy propyl acrylate | 15 |

| | | | | | Evaluation | |
|---|---|---|---|---|---|---|
| Ex. | Initiator (PHR) | Viscosity at 25° C. (cps) | Acid value | Softening point (°C.) | Problems of handling upon lamination | Deterioration test 60° C., 90% RH, 500 hr |
| 30 | D1.0 B0.5 | 530 | 0.6 | 120 | (1) Capable of forming a uniform thin layer | (1) No deterioration |
| 31 | B1.5 | 3,400 | 1.1 | 82 | (2) No problem of uneven thickness or air-entaining | (2) Adhesive force not reduced |
| 32* | D0.5 V1.5 | 7 | 11.4 | <20 | (1) Seepage of resin | |

TABLE 7-continued

| | | | | | | |
|---|---|---|---|---|---|---|
| | | EXAMPLES 30 TO 33 | | | | |
| 33* | E1.0<br>V1.0 | 7,500 | 7.6 | <20 | (2) Uneven thickness upon pressing<br>(3) Easily air-entrained<br>(1) Difficulty in forming a uniform thin layer<br>(2) Difficulty in degassing | (1) Remarkable oxidation deterioration of recording film<br>(2) Adhesive force greatly reduced |

*Examples 32 and 33 were Comparative.

As apparent from Table 7, in Examples 30 to 31, the problems of handling during lamination or adhesion and the deterioration of the recording film and the decrease of the adhesive force did not arise.

In contrast, the viscosities of the UV-curable resin compositions, i.e., 7 cps at 25° C. of Example 32 and 7500 cps at 25° C. of Example 33, were inappropriate and thus handling difficulties often arose, making practical usage thereof impossible. Moreover, the acid values were so high that the oxidation deterioration of the recording film was remarkable. Further, the adhesive force was insufficient after curing and remarkably reduced by the deterioration test in a hot and humid atmosphere, due to the acrylate and/or methacrylate having two functionalities.

We claim:

1. An optical recording medium, comprising:
a hard plastic substrate;
an optical recording film formed over said hard plastic substrate; and
a UV-cured resin layer formed over said optical recording film, said UV-cured resin being formed by curing a UV-curable resin composition which comprises:
a) 15 to 85% by weight of a first ingredient of an acrylate and/or a methacrylate having at least three functionalities;
b) 15 to 70% by weight of a second ingredient of a compound having a linear structure and a molecular weight of at least 300 and a molecular weight of at least 150 per ethlenically unsaturated bond;
c) at least 0.3% by weight of a photopolymerization initiator; and
d) not more than 40% by weight of a third ingredient of an acrylate and/or methacrylate having two functionalities; said UV-curable resin composition containing as an ingredient substantially no acrylate or methacrylate having one functionality, wherein said UV-cured resin layer has an acid value of not more than 1.5 and a softening point not lower than 50° C.

2. An optical recording medium according to claim 1, wherein said optical recording film is a magneto-optical recording film of an amorphous film consisting of at least one rare earth metal and at least one transition metal.

3. An optical medium according to claim 1, wherein said UV-cured resin layer has an acid value of not more than 0.1 and a softening point not lower than 115° C.

4. An optical medium according to claim 1, wherein said second ingredient is an addition polymerizable compound having at least one ethylenically unsaturated bond and a molecular weight of at least 150 per ethylenically unsaturated bond.

5. An optical medium according to claim 4, wherein said second ingredient is a phenol-based novolak epoxy acrylate or methacrylate compound.

6. An optical medium according to claim 1, wherein said UV-curable resin composition comprises 25 to 75% by weight of said first ingredient, 25 to 55% by weight of said second ingredient and at least 0.3% by weight of said photopolymerization initiator.

7. An optical medium according to claim 1, wherein said second ingredient has a molecular weight of more than 1000 per ethylenically unsaturated bond.

8. An optical medium according to claim 1, further comprising an inorganic layer between said recording film and said substrate.

9. An optical recording medium according to claim 1, further comprising another hard plastic substrate laminated over said UV-cured resin layer by an adhesive layer.

10. An optical medium according to claim 9, further comprising another optical recording layer formed between said UV-cured resin layer and said another hard plastic substrate.

11. A process for manufacturing an optical recording medium, said process comprising the steps of:
forming an optical recording film over a hard plastic substrate;
coating a UV-curable resin composition over said optical recording film to form a UV-curable resin layer, said UV-curable resin composition comprising:
a) 15 to 85% by weight of a first ingredient of an acrylate and/or a methacrylate having at least three functionalities;
b) 15 to 70% by weight of a second ingredient of a compound having a linear structure and a molecular weight of at least 300 and a molecular weight of at least 150 per ethlenically unsaturated bond;
c) at least 0.3% by weight of a photopolymerization initiator; and
d) not more than 40% by weight of a third ingredient of an acrylate and/or methacrylate having two functionalities; said UV-curable resin composition containing as an ingredient substantially no acrylate or methacrylate having one functionality, said UV-curable resin composition having an acid value of not more than 1.5 and a viscosity of 10 to 5,000 cps at 25° C.; and irradiating said UV-curable resin layer with UV rays to form said UV-cured resin layer.

12. An optical process according to claim 11, wherein said UV-cured resin layer has an acid value of not more than 0.1 and a softening point not lower than 115° C.

13. A process according to claim 11, further comprising the step of placing another hard plastic substrate over said UV-curable resin layer between said steps of forming the UV-curable resin layer and the UV irradiation thereof.

14. A process according to claim 13, wherein said another hard plastic substrate includes another optical recording film on a side thereof and said another optical recording film is located between said another hard plastic substrate and said UV-cured resin layer.

15. An optical recording medium according to claim 1, wherein said UV-cured resin layer has an acid value of not more than 0.7.

16. An optical recording medium according to claim 15, wherein said UV-cured resin layer has an acid value of not more than 0.1.

17. An optical recording medium according to claim 1, wherein said UV-cured resin layer has a softening point not lower than 80° C.

18. An optical recording medium according to claim 17, wherein said UV-cured resin layer has a softening point not lower than 115° C.

19. An optical recording medium according to claim 1, wherein said UV-cured resin layer has an acid value of not more than 0.7 and a softening point not lower than 80° C.

20. An optical recording medium according to claim 9, wherein said UV-cured resin layer itself is adhesive and wherein said optical recording medium comprises another hand plastic substrate adherence to said UV-cured resin layer.

21. A process according to claim 11, wherein said UV-curable resin composition has an acid value of not more than 0.7.

22. A process according to claim 21, wherein said UV-curable resin composition has an acid value of not more than 0.1.

* * * * *